DIGITAL COMPUTER WITH INDIRECT ADDRESSING

Filed Feb. 13, 1961 2 Sheets-Sheet 1

DIGITAL COMPUTER WITH INDIRECT ADDRESSING

Filed Feb. 13, 1961 2 Sheets-Sheet 2

INVENTORS.
PAUL D KING
ROBERT S. BARTON
JACK N. MERNER
BY
Christie, Parker & Hale
ATTORNEYS.

3,222,649

DIGITAL COMPUTER WITH INDIRECT ADDRESSING

Paul D. King, Pasadena, Robert S. Barton, Altadena, and Jack N. Merner, Azusa, Calif., assignors to Burroughs Corporation, Detroit, Mich., a corporation of Michigan Filed Feb. 13, 1961, Ser. No. 88,777
11 Claims. (Cl. 340—172.5)

Figure 1:
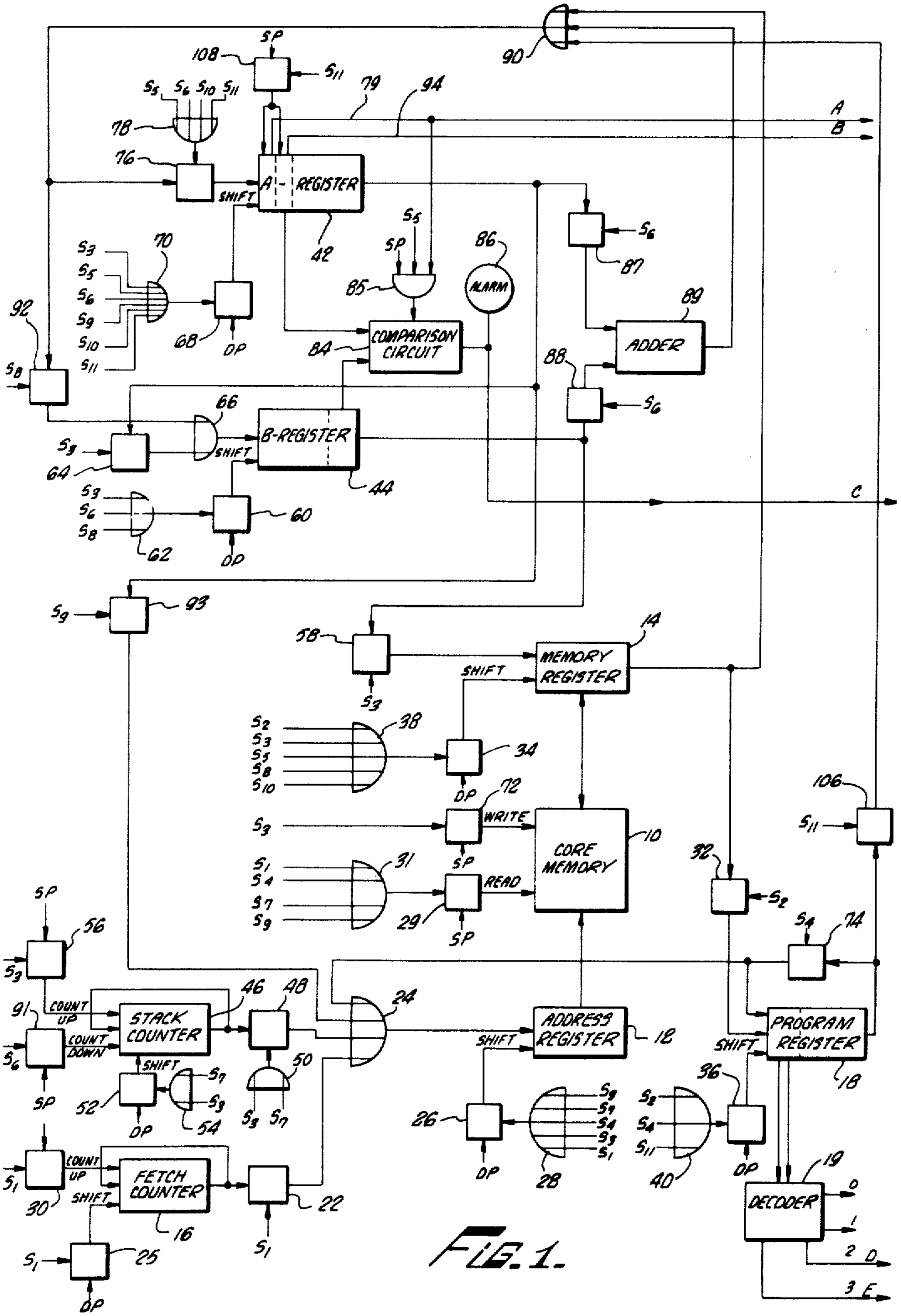

This invention relates to electronic digital computers, and more particularly, is concerned with an internally programmed digital computer having an improved arrangement for referencing storage locations for arrays of data.

In conventional types of internally stored program computers, data is stored in addressable memory locations where the data can be referenced when needed. The program instrutcions, loaded into the computer to solve a particular problem, include the addresses of data to be referenced at particular steps in the program. This data may be stored in advance or may be generated during the execution of the program. In either event, address locations must be assigned in advance when the program of instrutcions for a particular problem is compiled. This presents a difficult problem in originally compiling or in later modifying the program since it means that the programmer must always always keep track of allocations of all memory cells at all times. This problem becomes even more complex where multi-programming is undertaken, that is, where the computer may be loaded with more than one program at a time.

Indirect addressing has heretofore been proposed as a method of making programming independent of actual address locations of data storage in memory. By means of a special bit in an instruction, the word addressed in memory by the instruction is in turn used as an address. The same result has been achieved by using a special bit in the operand which flags that the operand is to be used as an address. By means of index registers and proper programming, this technique of indirect addressing permits arrays of data to be used without assigning specific address locations to each word in the array at the time the program is compiled. While the absolute address must later be inserted in the memory location referred to by the command, it can be different each time the program is run. Since the array may be indirectly addressed by a number of commands, the address of the commands remains unchanged and only the absolute address of the array need be changed if the location of the arrays is modified.

However, such prior art arrangements have a number of limitations which restrict their usefulness. In order to do indexing, special programming is required. Additional programming steps or additional bits in each instruction must be provided for indexing, which involves more storage capacity for the program. Special registers are required to do indexing of an array of data. Additional registers increase the complexity and cost of the machine. When storing an array of data in memory by this technique, it is possible to accidently invade a part of memory which has already been allocated to other data or, in the case of multi-programming, to invade a part of memory allocated to another program. The result would be to destroy other data or part of another program, which can have disastrous results and is an error extremely difficult to find.

The present invention provides an improved arrangement for effecting the advantages of indirect addressing which avoids the mentioned limitations of the prior art. This is accomplished, in brief, by the use of special words, called descriptors, in place of operand words in memory. When an instruction causes an operand to be read out of memory, it may find a data descriptor word instead. The data descriptor word includes a base address of an array of data, and, in addition, includes information identifying it as a descriptor instead of an operand, information as to whether indexing is required, and information as to the field length of the data array. When the descriptor is transferred to the arithmetic unit of the computer, it is automatically recognized as a data descriptor instead of an operand. If no indexing is indicated, the descriptor in the arithmetic unit is automatically replaced by the contents of the memory location indicated by the base address portion of the descriptor. If indexing is indicated, the length of the field information is checked against the amount to be added to the address during indexing. If the modified address is not outside the field of the data array, the address is modified by the addition of the desired amount. The descriptor is then replaced in the arithmetic unit by the contents of the memory location indicated by the modified address portion of the descriptor.

The data descriptor is also used in stroing a result in memory. The descriptor again provides a base address, which in the case of indexing is modified by a predetermined amount. This amount is checked against the field length information of the descriptor to determine if the modified address is within the allowed storage area, thus preventing storage of a result in some part of memory outside the allocated area.

Since indexing is always implied, no additional bits in a word or special programming are required to do indexing during addressing of memory. The field length bits can be used to indicate that no indexing is required by providing a zero field length indication in the descriptor. The field length bits in the descriptor give an automatic check to see that areas of memory not set aside for particular arrays of data are not invaded by errors in programming or other errors that may give rise to improper indexing.

By the use of descriptors, the program can be written independently of actual address location. The descriptors are stored separately from the program. Generally, a relatively few number of descriptors are necessary compared to the number of commands in a program. Thus the address in a descriptor can more easily be modified than the address portion of all the commands in a program that might reference the same group of data. The descriptor can be modified without any modification of the commands comprising the program. Moreover, the use of descriptors, according to the teaching of the present invention, permits the program to be segmented and only parts of a program stored and executed at a time. Each program segment can then be removed from memory and replaced by another segment without losing address information. All actual address information is stored in a table of descriptor words which can be stored, manipulated, or modified, independently of the program with which they are used.

Figure 2:
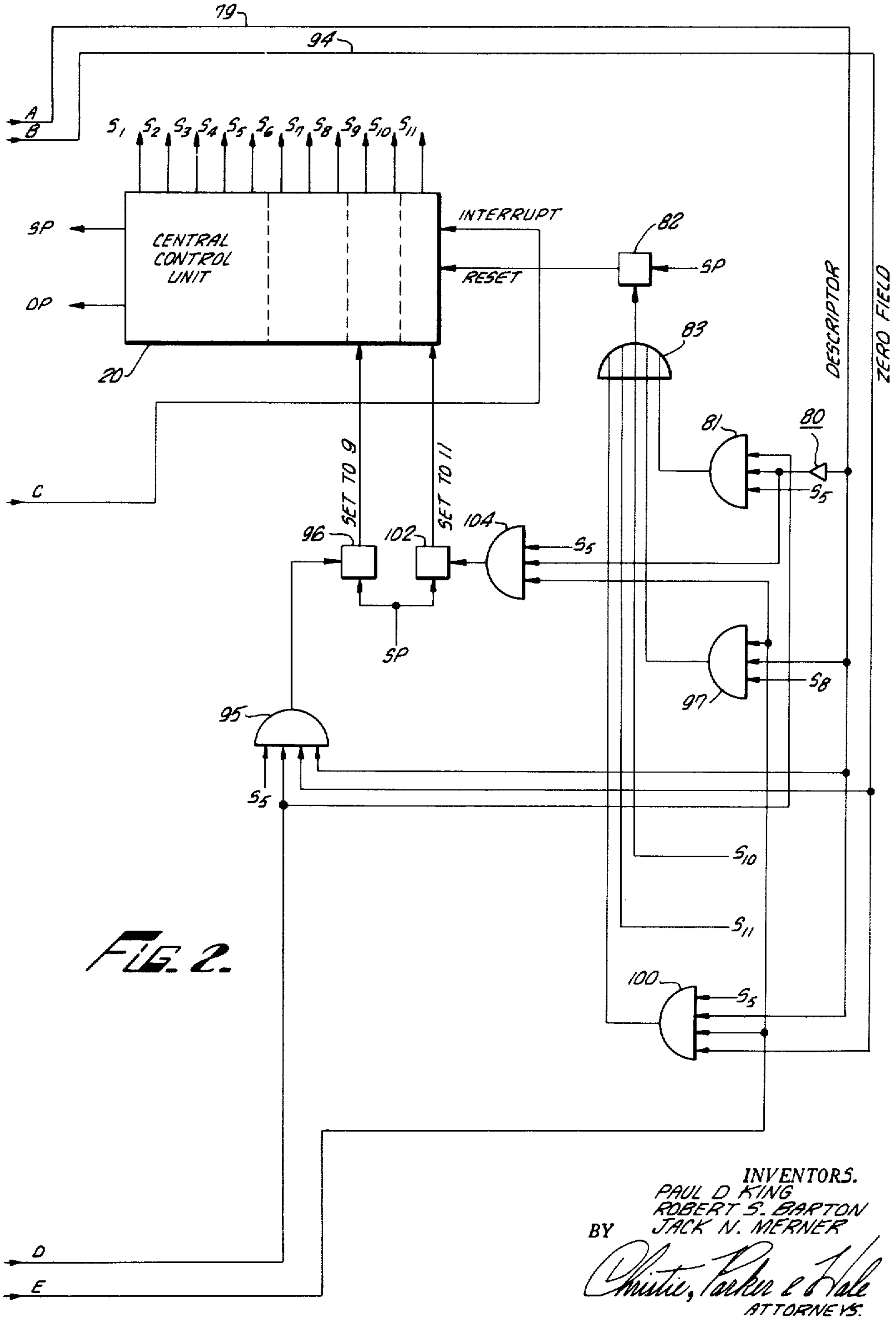

For a more complete understanding of the invention, reference should be made to the accompanying drawings, wherein:

FIGS. 1 and 2 together show a schematic block diagram of one embodiment of the present invention.

In copending application Serial No. 84,156, filed January 23, 1961, in the name of Paul D. King and Robert S. Barton and assigned to the assignee of the present invention, there is described a digital computer which executes a string of program syllables. These program syllables are arranged to either call forth operands from memory, introduce constants, or to initiate specified arithmetical or logical operations. As operands are called out of memory, they are placed in a temporary storage referred to as a "stack" memory. The arithmetic unit is arranged to always operate on the last two operands inserted into the top of the stack replacing, the last operand with the result and eliminating the other operand by replacing it with the next lower operand in the stack. The word "stack" is used to connote the function of this unit. The way the stack memory operates, it can be thought of as a stack of temporarily stored words placed one on top of the other in the order received. The words are automatically available from the top of the stack in the reverse order in which they are put in the stack. The preferred embodiment of the present invention is incorporated in a computer of the type described in the above-mentioned copending application.

As described in the above-mentioned copending application, the program consists of a string of program syllables which are of three types. One type of syllable, called an operator syllable, initiates some arithmetical or logical operation such as an addition, a subtraction, or the like. Operands are placed in the stack by two other types of syllables, one of which is called a "literal" syllable, and the other which is called a "value call" syllable. The literal syllable acts to place itself in the stack memory as a constant, whereas the value call syllable transfers an operand from the main memory into the stack memory. An additional syllable, not described in the above-mentioned copending application but hereinafter described in more detail, is called a "name call" syllable and is used in placing an address in the form of a data descriptor in the stack memory.

Referring now to the drawing in detail, the numeral 10 indicates generally a random access memory, such as a magnetic core memory, in which binary coded words are stored in addressable memory locations. The memory locations are selected by binary coded addresses stored in an Address register 12. Binary coded information words are transferred into and out of specified memory locations in the core memory 10 through an input/output Memory register 14. Transfer is from a specified memory location to the register 14 or from the register 14 to the specified address location and is initiated by a pulse on one or the other of two inputs, designated respectively the "Write" input and the "Read" input. Addressable core memories of this type are well known in the computer art. See, for example, the book "Digital Computer Components and Circuits" by R. K. Richards, D. van Nostrand Company, 1957, chapter 8.

A portion of the core memory 10 is allocated to the storage of the program syllables, which are stored in consecutive memory locations and are fetched from memory in consecutive order by means of a Fetch counter 16. The counter 16 is initially set to a value corresponding to the address location of the first program syllable in memory and then is caused to be counted up one each time a program syllable is transferred out of memory. Each time a program syllable is to be transferred out of the core memory, the contents of the Fetch counter 16 are transferred to the Address register 12. It should be noted that since serial operation is assumed throughout in which words are transferred character by character between registers, the counter 16 is also arranged as a shift register so that its contents can be shifted from the counter 16 serially into the register 12. However, it should be understood that while serial operation is given by way of example, the invention is equally applicable to parallel operation.

Each program syllable read out of the core memory 10 is transferred from the Memory register 14 to a Program register 18. It is while in the Program register 18 that the syllable is decoded to determine which type of syllable it is so that the computer can be controlled accordingly. Each program syllable contains two bits for designating which of the four types of syllables a particular syllable is. After a program syllable is placed in the Program register 18, these two binary bits are sensed and applied to a decoder 19 which energizes one of four output lines, numbered 0, 1, 2 and 3, depending upon which of the four syllable types is being stored in the Program register 18. The operator syllables, the literal syllables, the value call syllables, and the name call syllables respectively produce high levels on the line 0, the line 1, the line 2, and the line 3.

A central control unit 20 functions to cause the individual units of the computer to perform in such a manner that program syllables are fetched in the proper sequence, decoded and executed as required. A suitable control unit is described in detail in copending application Serial No. 788,823, now Patent Number 3,001,708, filed January 26, 1959, in the name of Edward L. Glaser and assigned to the assignee of the present invention. The central control unit 20 includes a counter (not shown) arranged to be stepped through a succession of states, to be set to any selected state, or be reset. Only eleven states are shown in the figure, designated $S_1$ through $S_{11}$, since these are the only states required to carry out the particular functions with which the present invention is directly related. The central control unit 20 is further arranged to generate a predetermined number of digit pulses, designated DP's, while in each state, each group of DP's being followed by one step pulse, designated SP. The generation of the SP normally causes the counter of the central control unit to advance to the next state.

The $S_1$ and $S_2$ states of the central control unit are common to all syllable executions and are used to control the fetch operation of the next syllable in the core memory. To this end, the $S_1$ state is applied to a gate 22 on the output of the Fetch counter 16, permitting transfer of the contents of the Fetch counter 16 through a "logical or" circuit 24 into the address register 12. The $S_1$ state also opens a gate 25, permitting DP's to be applied to the shift input of the Fetch counter 16, the number of DP's generated during the $S_1$ state being just sufficient to transfer a complete word from the Fetch counter 16 to the Address register 12. DP's are also applied through a gate 26 to the shift input of the Address register 12 in response to the $S_1$ level applied to the gate 26 through a "logical or" circuit 28. After the required number of DP's are generated to shift the contents of the register 16 into the Address register 12, the following SP sets the central control unit to the $S_2$ state.

The same SP generated at the end of the $S_1$ state is also applied to the "Read" input of the core memory 10 by means of a gate 29 which is biased open by the $S_1$ level applied through a "logical or" circuit 31. As a result, the addressed word in the core memory 10 is read into the Memory register 14 at the end of the $S_1$ state. At the same time, the SP is used to count up the Fetch counter 16 by applying it to a gate 30 which is open during the $S_1$ state. In this way, the Fetch counter is advanced to the address location of the next program syllable in the program string stored in the memory.

During the $S_2$ state, the gate 32 is open, permitting transfer of the program syllable from the Memory register 14 to the Program register 18. DP's are applied to the shift inputs of the two registers through gates 34 and 36 respectively. The high level of the $S_2$ state is applied to these respective gates through "logical or" circuits 38 and 40 respectively. In this way, the program syllable is transferred into the Program register 18 where the syllable type is decoded by means of the decoder 19.

If an operator syllable or a literal syllable is sensed in the Program register at the end of the $S_2$ state, operation of the computer continues in the manner described in the above-mentioned copending application Serial No. 84,156. In the case of a Literal syllable, the contents of the Program register 18 are transferred to the top of the stack memory, namely, the A-register 42. At the same time, the contents of the stack memory are "pushed down" in the manner hereafter described. In the case of an Operator syllable, an operation is initiated on the contents of the top two operands in the stack memory, namely, the contents of the A-register 42 and the B-register 44, as by means of an Adder 89. The result of the operation then is automatically returned to the top of the stack memory. Since the present invention is not concerned with the operation of the computer in response to either of these two syllable types, further description in this regard is not considered in detail. If a value call syllable or a name call syllable has been transferred to the Program register 18, the central control unit 20 automatically advances to the $S_3$ state. As mentioned above, the function of the value call syllable is to transfer an operand from a specified memory location, the address of which is contained as part of the value call syllable, into the top of the stack memory.

In the particular embodiment shown in the drawing, the stack memory includes a portion of the core memory 10 designated by a Stack counter 46. In addition, the stack consists of an A-register 42, that normally forms the top of the stack into which operands are transferred when placed in the stack, and a B-register 44, that represents the storage position immediately below the top of the stack into which operands from the A-register are transferred when another operand is added to the stack. Normally, an operand is placed in the top of the stack by inserting it in the A-register 42. The operand is moved down in the stack by transferring it from the A-register 42 to the B-register 44 and from the B-register into the memory location in the core memory 10 designated by the Stack counter 46. Each time an operand is placed in the core memory 10, the Stack counter 46 is counted up one. Whenever an operand is removed from the core memory 10, the Stack counter is first counted down one so that it corresponds to the location of the last operand to be placed in the core memory portion of the stack. In this way, the stack portion of the core memory is always addressed on the basis of the last operand in being the first operand out.

When a value call syllable is encountered, calling for an operand to be inserted in the top of the stack, the contents of the stack must in effect be moved down. Thus when the central control counter advances to the $S_3$ state, the contents of the Stack counter 46 are transferred to the Address register 12 through a gate 48 which is biased open by applying the $S_3$ level through a "logical or" circuit 50 to the gate 48. The Stack counter 46 is arranged as a shift register, DP's being applied to a gate 52 to the shifting input of the Stack counter 46 during the $S_3$ state by applying the $S_3$ level to the gate 52 through a "logical or" circuit 54. DP's are also applied to shift the Address register 12 by applying the $S_3$ level to the "logical or" circuit 28 to bias open the gate 26. At the termination of the $S_3$ state, an SP is generated and applied to the "count up" input of the Stack counter 46 through a gate 56, which is biased open during the $S_3$ state.

Also during the $S_3$ state, the contents of the B-register 44 are transferred to the Memory register 14 and the contents of the A-register 42 are transferred to the B-register 44. To this end, a gate 58 is biased open during the $S_3$ state and DP's are applied to the shift input of the B-register 44 through a gate 60 biased open by applying the $S_3$ level through a "logical or" circuit 62 to the gate 60. The gate 34 is also open during the $S_3$ state to apply DP's to the shift input of the Memory register 14. A gate 64 is biased open during the $S_3$ state permitting transfer from the A-register 42 to the B-register 44 through a "logical or" circuit 66. DP's are applied to the shift input of the A-register 42 through a gate 68 which is biased open by applying the $S_3$ level through a "logical or" circuit 70 to the gate 68.

After the required number of DP's are generated during the $S_3$ state to shift the contents of the A-register 42 into the B-register 44 and shift the contents of the B-register 44 into the Memory register 14, a memory "Write" operation is initiated by an SP applied to the "Write" input of the core memory 10 through a gate 72.

Continuing with the assumption that a value call syllable is stored in the Program register 18, the central control unit now advances to the $S_4$ state during which the value call syllable is transferred to the Address register 12 where the address portion is used for addressing the core memory 10. To this end, during the $S_4$ state, a gate 74 is biased open, permitting the flow of information from the Program register 18 through the "logical or" circuit 24 to the Address register 12. DP's are applied through the gate 26 to the shift input of the Address register 12 and through the gate 36 to the shift input of the Program register 18. At the same time, the syllable is recirculated back through the input of the Program register 18, so that the syllable remains in the register. When an SP is generated, it is applied through the gate 29 to the "Read" input of the core memory 10 causing the contents of the address memory location to be transferred into the Memory register 14. At the same time, the central control unit is advanced to the $S_5$ state.

During the $S_5$ state, the operand which is now in the Memory register 14 is transferred into the top of the stack, namely, the A-register 42. To this end, a gate 76 is biased open by applying the $S_5$ state thereto through a "logical or" circuit 78. At the same time, DP's are applied to the shift input of the A-register 42 by biasing open the gate 68 and DP's are applied to the shift input of the Memory register 14 by biasing open the gate 34. At the completion of the $S_5$ state, the word is then transferred from a specified address location into the A-register. If this word is the desired operand, operation is complete and the central control unit 20 returns to the $S_1$ state to fetch the next program syllable. The above operation is identical to that described in copending application Serial No. 84,156 for executing a value call syllable.

According to the principles of the present invention, in order to effect indirect addressing, the word transferred from the core memory 10 into the A-register may not be an operand but may be a data descriptor. The format for a data descriptor word includes one bit which identifies whether the word is an operand or a descriptor. This may be the left-hand bit as stored in the A-register 42. The next group of bits designates the length of the field, i.e., the number of words in an array of data stored in the core memory 10 or the number of locations available for storage of words in the core memory 10. The remaining bits to the right-hand end of the descriptor as stored in the A-register 42 designate the base address of the array in the core memory 10.

During the $S_5$ state, after the DP's have shifted a complete word into the A-register 42, the left-hand bit is sensed to determine whether an operand or a descriptor has been placed in the A-register. If a descriptor has been placed in the A-register, a high level is applied, by the flip-flop storing the bit, to an output lead 79. The logic associated with the central control unit 20 is such that if this level is low, indicating that an operand is now in the A-register, the central control unit automatically returns to the $S_1$ state in response to the SP generated at the end of the $S_5$ state. Thus the level of the line 79 is applied through the inverter circuit 80 to a "logical and" circuit 81. The $S_5$ line and the line 2 from the decoder 19 are also applied to the "logical and" circuit 81. If all conditions are true, indicating that an operand is transferred in response to a value call syllable, the output of the "logical and" circuit goes high, biasing open a gate 82 through a "logical or" circuit 83. This permits the next SP to reset the counter of the central control unit 20 back to the $S_1$ state. On the other hand, if a high level is present on the line 79, indicating that a data descriptor is stored in the A-register 42, the next SP automatically advances the central control unit 20 to the $S_6$ state.

For indexing of a data descriptor, for example, a literal syllable may be used ahead of the value call syllable to put an indexing constant into the stack. This amount is transferred from the A-register 42 to the B-register 44 when the data descriptor is placed in the A-register 42 by the value call syllable during the $S_3$ state described above. Execution of a literal syllable is described in the above-mentioned copending application Serial No. 84,156. However, the contents of the B-register may have been placed in the stack by any of the means available for placing operands in the stack.

With the descriptor stored in the A-register, the field length bits are applied to a comparison circuit 84 where a comparison is made with a corresponding number of bits located in the right-hand positions of the word indexing stored in the B-register. The comparison circuit 84 is a grating circuit whose logic is arranged such that a pulse is passed through the gating circuit only if the binary number represented by the group of bits sensed in the B-register is equal to or greater than the binary number represented by the group of bits sensed in the A-register. An SP is applied to the comparison circuit 84 through a "logical and" circuit 85 to which is also applied a high level during the $S_5$ state and the high level derived from the line 79 in response to the descriptor identifying bit in the left-hand position of the A-register 42. Thus as a data descriptor is stored in the A-register, the SP generated at the end of the $S_5$ state is applied to the comparison circuit 84. If the positive binary number in the B-register 44 is equal to or greater than the field length represented by the number in the A-register 42, a pulse is passed by the comparison circuit 84 to an alarm 86. The same pulse is applied to the central control unit 20 to interrupt further operation of the computer. In this manner, a protective arrangement is provided which signals that any subsequent modification of the base address by the amount stored in the B-register extends outside of the array specified by the data descriptor. This provides a check against an error which otherwise might permit an operand to be read out or stored in a memory location which is outside of the memory area specified by the data descriptor.

Assuming that no alarm condition exists and that a data descriptor is stored in the A-register 42, the central control unit 20 advances automatically to the $S_6$ state during which the contents of the B-register 44 are added to the contents of the A-register 42 and the results stored in the A-register 42. In this way, the base address of the data descriptor can be modified by any predetermined amount to provide automatic indexing.

To this end, the $S_6$ state is applied to the gate 68 through the "logical or" circuit 70 to apply shifting pulses to the A-register 42. Also the $S_6$ state is applied to the gate 60 through the "logical or" circuit 62 so as to apply shifting pulses to the B-register 44. Also gates 87 and 88 are open during the $S_6$ state for connecting the outputs of the A-register and the B-register respectively to the two inputs of an adder 89. The output of the adder is coupled through a "logical or" circuit 90 back to the gate 76 on the input of the A-register 42. The $S_6$ state is applied to the gate 76 through the "logical or" circuit 78.

Since at the end of the add cycle, the B-register 44 is empty, the last operand in point of time placed in the memory portion of the stack is moved into the B-register. The SP at the end of the $S_6$ state is used to count down the Stack counter 46 by one. The SP is applied to the "count down" input of the Stack counter through a gate 91 which is biased open during the $S_6$ state. The number in the Stack counter 46 now corresponds to the memory location of the last operand stored in the stack portion of the core memory 10. When the central control unit advances to the $S_7$ state, the operation is initiated for bringing the last operand placed in the core memory 10 back into the B-register 44.

When the central control unit is placed in the $S_7$ state, the contents of the Stack counter 46 are transferred to the address register 12. This is accomplished by biasing open the gate 48 and applying shifting pulses to the counter 46 through the gate 52 and applying shifting pulses to the Address register 12 through the gate 26, permitting the serial shifting of the contents of the Stack counter into the Address register. The SP occurring at the end of the $S_7$ state is applied through the gate 29 to initiate a readout from the core memory 10 into the Memory register 14.

With the central control unit advanced to the $S_8$ state, a gate 92 is biased open, permitting information to be transferred from the output of the Memory register 14 through the "logical or" circuit 90 to the input of the B-register 44 through the "logical or" circuit 66. At the same time, DP's are applied through the gates 34 and 60 to the shifting inputs respectively of the Memory register 14 and the B-register 44.

At this point, if the decoder 19 indicates that a value cell syllable is stored in the Program register, as has been assumed in the above discussion, the central control unit 20 automatically advances to the $S_9$ state in response to the SP at the end of the $S_8$ state. During the $S_9$ state, the address portion of the modified data descriptor is transferred into the Address register 12. This is accomplished by means of a gate 93 which couples the output of the A-register 42 to the input of the Address register 12 through the "logical or" circuit 24. At the same time, the required number of DP's are applied to shift the address bits out of the A-register 42 into the Address register 12 through the respective gates 68 and 26. At the completion of the shifting operation, the SP is applied to the gate 29 which is biased open during the $S_9$ state through the "logical or" circuit 31. Thus, at the completion of the $S_9$ state, a selected operand is transferred out of the core memory 10 into the Memory register 14. This operand is then placed in the top of the stack during the $S_{10}$ state by applying the $S_{10}$ level to the gate 76 through the "logical or" circuit 78 and opening the gates 34 and 68 through the "logical or" circuits 38 and 70 respectively so that DP's can be applied to the shifting inputs of the Memory register 14 and the A-register 42.

From the description thus far, it will be seen that if a value call syllable is being executed, requiring an operand to be placed in the stack, the central control unit 20 advances through states $S_1$ through $S_5$. At the end of the $S_5$ state, the contents of the A-register 42 forming the top of the stack are tested to determine whether an operand or data descriptor has been transferred into the stack. With an operand, the central control unit 20 returns to the $S_1$ state and a new program syllable is fetched from the core memory 10 into the Program register 18. However, if a data descriptor is sensed by means of a high level on the line 79, the central control unit 20 goes through states $S_6$ through $S_{10}$, during which automatic indexing of the address portion of the data descriptor takes place by adding the contents of the B-register to the address portion of the data descriptor in the A-register. The modified address is then used to transfer an operand from the core memory 10 into the A-register 42. Thus it will be seen that indirect addressing with automatic indexing is provided. The comparison circuit 84 provides a means of automatically checking to make sure that the automatic indexing does not extend outside the field of the allocated storage space defined by the data descriptor.

Sometimes it may be desirable to do indirect addressing without indexing. This is provided by storing a zero in the field length portion of the data descriptor. A zero stored in the field length portion of the data descriptor in the A-register 42 produces a high level on an output line 94 which is applied to the central control unit 20. A high level on the line 94 causes the central control unit 20 to advance directly from the $S_5$ state to the $S_9$ state, thus skipping over the $S_6$, $S_7$ and $S_8$ states, during which indexing otherwise would take place. This is accomplished by means of a "logical and" circuit 95 operating a gate 96. The "logical and" circuit responds to the $S_5$ state, a value call syllable level on line 2 from the decoder 19, a descriptor in the A-register 42 represented by a high level on the line 79, and a zero field length represented by a high level on the line 94. If all these conditions are true, the gate 96 is biased open and the SP at the end of the $S_5$ state sets the counter in the central control unit 20 ahead to the $S_9$ state. In this manner, the unmodified address portion of the data descriptor as stored in the A-register 42 is used to address the core memory 10 and the contents of the address location are transferred into the A-register in place of the data descriptor.

Thus a value call syllable either places an operand in the A-register or, by means of a data descriptor, indirectly addresses an array of data in the memory and places the operand in the *a*-register. In some operations it is desirable to place a descriptor in the stack rather than an operand. A fourth type of program syllable, called a name call syllable, is used for placing a descriptor in the stack. A descriptor may be placed in the stack for a number of reasons, all of which basically involve the need at some subsequent operation of an address. For example, if it is desired to store data back into memory, a data descriptor is placed in the stack so that it is available when an operator syllable calling for a Store operation is brought into the Program register 18. The descriptor then provides an address to store an operand in memory from the stack.

Assuming a name call syllable is placed in the Program register 18 during the $S_1$ and $S_2$ states, the central control unit 20 continues through the $S_3$, $S_4$ and $S_5$ states in the identical manner described above in connection with the execution of a value call syllable. At the end of the $S_5$ state, a word has been transferred from the core memory 10 into the A-register 42 and the stack has been pushed down. Again the left-hand digit in the A-register 42 is sensed to determine whether it is a zero bit or a one bit, identifying whether the word is an operand or a data descriptor. If it is a data descriptor, the comparison circuit 84 makes a comparison between the field length bits of the data descriptor and the corresponding number of bits in the right-hand portion of the word stored in the B-register 44. The alarm 86 is sounded and the central control unit 20 is interrupted if the content of the B-register 44 is equal to or exceeds the field length specified by the data descriptor in the A-register 42. If the field length is greater than the number stored in the B-register 44, the central control unit advances through the $S_6$, $S_7$ and $S_8$ states, during which automatic indexing takes place by the addition of the contents of the B-register 44 to the contents of the A-register 42 in exactly the same manner as described above in connection with automatic indexing of a data descriptor in response to a value call syllable.

At the completion of automatic indexing, the central control unit 20, in response to a name call syllable, is returned to the $S_1$ state. In this manner, a modified data descriptor remains in the A-register of the stack. This is accomplished by a "logical and" circuit 97 which opens the resetting gate 82. The "logical and" circuit senses a name call syllable by the high level on line 3 from the decoder 19. It also senses the $S_8$ state, and that a descriptor is present in the *a*-register 42 by the high level on the line 79.

As in the case of a value call syllable, if the data descriptor placed in the A-register 42 in response to a name call syllable specifies a zero field length, no indexing is effected. In this event, the central control unit 20 does not advance from the $S_5$ state to the $S_6$ state, but is directly reset back to the $S_1$ state. Resetting is effected by a "logical and" circuit 100 which senses the high level on the line 92, which is indicative of a zero in the field length portion of a data descriptor word in the A-register 42. The "logical and" circuit 100 also senses that a data descriptor is stored in the A-register 42 by the high level on the line 79. The "logical and" circuit also senses that a name call syllable is stored in the Program register 18 by the high level on the output line 3 from the decoder 19. If all these conditions are true, the output of the "logical and" circuit opens the gate 82 permitting the next SP to reset the central control unit back to the $S_1$ state.

In the event that the word transferred from the core memory 10 to the A-register 42 in response to a name call syllable is an operand instead of a data descriptor, the central control unit 20 is caused to skip the $S_5$ state to the $S_{11}$ state. This is accomplished by gating an SP through a gate 102 to set-to-11 input of the central control unit 20. The gate 102 is controlled by a "logical and" circuit 104 to which is applied the line 3 from the decoder 19, indicating that a name call syllable is in the Program register 18, the output of the negating circuit 80 connected to the line 79, which assumes a high level when an operand is stored in the A-register 42, and the $S_5$ level from the central control unit 20. When all the conditions on the input of the "logical and" circuit 104 are true, the central control unit is advanced from the $S_5$ state to the $S_{11}$ state.

During the $S_{11}$ state, a data descriptor is automatically established in the A-register 42. The address portion of this data descriptor corresponds to the address of the operand in the core memory 10. Since this address is carried as part of the name call syllable, the address portion of the name call syllable in the Program register 18 is transferred through a gate 106, biased open during the $S_{11}$ state, and through the "or" circuit 90, into the A-register 42 through the gate 76. DP's are applied to the shifting input of the Program register 18 through the gate 36 and to the A-register 42 through the gate 68. When the SP is generated at the end of the $S_{11}$ state, it is passed by a gate 108 to set the field length portion of the A-register 42 and to set the identifying bit portion. The SP applied to the identifying bit portion inserts a one bit, indicating that the word is now a data descriptor and the SP sets the field length to zero. At the end of the $S_{11}$ state, the SP resets the central control unit 20 back to the $S_1$ state to fetch the next program syllable.

From the above description, it will be recognized that a computer is provided in which a table of descriptors, separate from the program, can be used for referencing areas of the main memory. The descriptors each provide a base address and identify a memory field from the base address. The field specified in the descriptor provides automatic storage protection when doing indexing. Indexing is always implied whenever a descriptor is encountered, except where a zero field length is specified.

The string of program syllables can be compiled independently of absolute addresses of data storage in the main memory. The program syllables need only address a relatively few descriptors in the table of descriptors. The address portion of the descriptors can be filled in whenever the program is run and need not be the same each time the program is run. Thus, without altering the program itself, memory locations can be set aside at the time a problem is run on the computer, using storage space not already used for other programs or other segments of the same program. The main memory facility can be expanded at any time without any alteration of the complied program, and the increased storage facility used merely by modifying the address portion of the descriptors.

What is claimed is:

1. In a computer in which a string of digitally coded program syllables are executed in sequence, the syllables being of a plurality of different types designated by a first group of digits in each program syllable, the combination comprising a program register for storing a program syllable while it is being executed by the computer, a main storage device for storing digitally coded words in addressable locations, a temporary storage device including first and second registers for storing an indefinite number of digitally coded words, decoding means coupled to the program register and responsive to said first group of digits in the program syllable for generating signals indicative of the type of syllable in the program register, means responsive to the signal from the decoding means when either of two syllable types is in the program register for transferring a word from the main memory to one of the registers in the temporary storage device, the transferring means including means coupled to the program register and responsive to a second group of digits in the program syllable for addressing the desired word in the main memory according to said second group of digits, an adder having two inputs coupled respectively to the two registers of the temporary storage for adding the contents of the two registers, and means responsive to a first group of digits of the word in said one register and to the signal from the decoding means for adding the contents of the two registers in temporary storage in the adder and transferring the results back into said one register automatically when a predetermined value is present in said first group of digits and either one of said two program syllables is in the program register.

2. A computer as defined in claim 1 further including means responsive to the signal from the decoding means for automatically replacing the results of the addition by a word transferred from the main memory to said one register when a particular one of said two program syllables is in the program register, whereby the results of the addition are replaced in said one register, the transferring means including means coupled to said one register in the temporary storage device and responsive to a second group of digits of the word stored in said one register for addressing the desired word in the main memory according to said second group of digits.

3. A computer as defined in claim 1 further including means for comparing the first group of digits of the word in said one register when the word is initially transferred from the main memory into the register with a selected group of digits of the word in the other register in the temporary storage, and means responsive to the signal from the decoding means and responsive to the comparing means for initiating an alarm condition when either of said two syllables is in the program register and the comparing means indicates that the number represented by the selected group of digits in said other of the registers is equal to or smaller than said first group of digits in said one of the registers.

4. A data processor comprising memory means for storing groups of digits in addressable locations, each group of digits including at least one bit designating the group as being an operand or a descriptor, an arithmetic unit including first and second registers, an adder means for applying the contents of the two registers to the adder and coupling the output of the adder back to the first register during an add cycle, means for transferring a selected group of digits from the memory means to the first register, means connected to the first register responsive to said at least one bit in the group stored in the first register for automatically initiating an add cycle in the arithmetic unit when said at least one bit designates the group as a descriptor, and means responsive to the resulting group of digits in the first register after the add cycle for replacing the contents of the first register with a group of digits from the memory means including means for selecting the group of digits from the address location in the memory means designated by said resulting group of digits.

5. A data processor comprising memory means for storing groups of digits in addressable locations, each group of digits including at least one bit designating the group as being an operand or a descriptor, an arithmetic unit including first and second registers, an adder and means for applying the contents of the two registers to the adder and coupling the output of the adder back to the first register during an add cycle, means for transferring a selected group of digits from the memory means to the first register, and means connected to the first register and responsive to said at least one bit in the group stored in the first register for automatically initiating an add cycle in the arithmetic unit when said bit designates the group as a descriptor.

6. A digital computer in which data is indirectly addressed comprising memory means for storing words in addressable memory locations, the words being of at least two coded types designated by specified bits in each word, means for storing a string of digitally coded program control syllables, the syllables being of a plurality of coded types designated by a first group of specified bits in each syllable, an additional group of specified bits in the program syllables designating the address of a memory location, an arithmetic unit including first and second registers and means for adding the contents of the first and second registers and storing the result in the first register, means for sequentially decoding the program syllables including means responsive to the bits designating one program syllable type for transferring the contents of the memory location specified by the program syllable to the first register, means for sensing the bits of the word in the first register specifying the word type, said sensing means producing a signal indicative of the word type, means responsive to the signal from the sensing means for actuating the arithmetic unit to add the contents of the first and second registers and store the results in the first register only when one of said two types of words is sensed, means for addressing the memory means in response to the contents of the first register following the addition, and means responsive to the addressing means for replacing the contents of the first register with the contents of the memory location addressed by the addressing means.

7. A data processor comprising a storage facility for storing a plurality of digitally coded words, the words being of at least two identifiable types, an arithmetic unit including first and second means for separately storing two digitally coded words, means for transferring a selected word from the storage facility into the first word storing means of the arithmetic unit, means responsive to a first group of digits in the word in said first word storing means for producing a signal indicative of the type of word transferred, means responsive to said signal for comparing the magnitude of a second group of digits in the word stored in said first word storing means of the arithmetic unit with a group of digits in the word stored in the second word storing means of the arithmetic unit, and means responsive to the comparing means for initiating an addition of the two words in the arithmetic unit if said second group of digits is greater in magnitude than the other group of digits compared, the result of the addition being stored in one of said word storing means of the arithmetic unit.

8. In a digital processor in which internally stored program syllables are executed in sequence, apparatus for addressing data locations in response to particular program syllables containing address information comprising an addressable storage facility for storing digitally coded words, the storage facility having a group of descriptor words in predetermined locations directly addressable in response to address information of the program syllables, each descriptor word having a first group of digits designating a base address of a data array and a second group of digits designating the number of words in the data array, a first register for storing a digitally coded word, means for transferring a word between said first register and any selected location in the storage facility, means for storing a program syllable during the execution of the syllable, means responsive to the address portion of the syllable storing means for actuating said transferring means to transfer a selected word from said group of descriptor words to the first register, means responsive to digits in the descriptor word in the first register for automatically actuating said transferring means to transfer a selected operand word from the addressable storage facility to the first register, said last-named means including means for addressing the storage facility in response to the first group of digits in the descriptor word designating an address, whereby a program syllable indirectly addresses operand words in the storage facility by means of descriptor words stored as part of said group of words, a second register, and means responsive to the second group of digits in a descriptor word stored in said first register for automatically modifying the first group of digits in the first register by the contents of the second register when the second group of digits is equal to or less than the contents of the second register.

9. A digital apparatus comprising addressable digitally coded word storage means for storing data descriptor words and arrays of operand words in addressable locations, each array having a base address with the words in the array stored in consecutive locations, each data descriptor word having binary coded bits designating the word as a data descriptor, designating the base address of an array of operand words, and designating the number of consecutive operand locations in the array, a temporary storage unit including first and second registers, means including an address register for transferring words from a selected address location determined by the contents of the address register to the first register of the temporary storage unit, means coupled to the first register in the temporary storage unit for sensing the bits designating the contents of the first register as a data descriptor word, and means coupled to the first register in the temporary storage unit and responsive to said sensing means when a data descriptor word is sensed for modifying the base address bits of the descriptor word by the contents of the second register.

10. Apparatus as defined in claim 9 further including means for comparing the bits of the data descriptor word in the first register designating the number of memory locations of an array with the contents of the second register, and means for generating an alarm condition if the contents of the second register is greater than or equal to the specified number of memory locations.

11. Apparatus as defined in claim 9 further including means responsive to the modified base address bits of the descriptor word in the first register for transferring the modified address bits to said address register and actuating said word transferring means, whereby a word from memory is selected according to the modified base address and transferred to the first register.

References Cited by the Examiner

UNITED STATES PATENTS

| | | | |
|---|---|---|---|
| 3,015,441 | 1/1962 | Rent et al. | 235—157 |
| 3,036,773 | 5/1962 | Brown | 235—157 |

OTHER REFERENCES

Ballistic Research Laboratories Report No. 115, March 1961, pp. 500–525.

Handbook of Automation Computation and Control, vol 2, Jan. 27, 1961, pp. 2–193 through 2–195.

MALCOLM A. MORRISON, *Primary Examiner.*

STEPHEN W. CAPELLI, *Examiner.*